United States Patent [19]

Yu et al.

[11] 4,132,632

[45] Jan. 2, 1979

[54] SELECTIVE HYDRODESULFURIZATION OF CRACKED NAPHTHA

[75] Inventors: Albert P. Yu, Taipei, Taiwan; Edward C. Myers, Glen Ellyn, Ill.

[73] Assignee: Standard Oil Company (Indiana), Chicago, Ill.

[21] Appl. No.: 892,389

[22] Filed: Mar. 31, 1978

[51] Int. Cl.² .............................................. C10G 23/02
[52] U.S. Cl. ..................................... 208/216; 252/465; 252/475
[58] Field of Search ...................... 208/216R, 255, 257; 252/468

[56] References Cited

U.S. PATENT DOCUMENTS

| 2,392,579 | 1/1946 | Cole ..................................... 208/257 |
| 3,269,938 | 8/1966 | Lefrancois ........................ 208/216 R |
| 3,956,105 | 5/1976 | Conway ............................... 208/255 |

*Primary Examiner*—George Crasanakis
*Attorney, Agent, or Firm*—Geoffrey M. Novelli; Arthur G. Gilkes; William T. McClain

[57] ABSTRACT

An improved process for desulfurization of cracked naphtha using a catalyst comprising a Group VIB metal in an amount of about 4 wt.% to about 6 wt.% and a Group VIII metal in an amount of about 0.5 wt.% to about 2 wt.% deposited on a solid support comprising at least 70 wt.% magnesium oxide, the amount of said Group VIB and Group VIII metals being based on the total weight of the catalyst and being calculated as the oxide of the respective metal.

8 Claims, 1 Drawing Figure

SELECTIVE HYDRODESULFURIZATION OF CRACKED NAPHTHA

This invention relates to a catalytic process for hydrodesulfurization of cracked naphtha suitable for gasoline. More particularly, this invention relates to selective desulfurization of cracked naphtha using a new cobalt-molybdenum catalyst with improved effectiveness in minimizing olefin saturation under desulfurization conditions.

One of the blending components to be used in a refinery gasoline pool is cracked naphtha. Cracked naphtha contains both sulfur and olefins. The sulfur, which may be present in amounts that are about 0.3 wt. % or larger, is both a potential air pollutant and a poison to the catalysts that might be used in the catalytic muffler of an automobile engine's exhaust system. On the other hand, the olefins, which may be present in an amount of about 30 wt. % or larger, have octane numbers that are higher than those of the corresponding saturates.

Today, sulfur dioxide that is generated by the burning of high sulfur fuels has been identified as one of the chief air pollutants. Hydrodesulfurization is an important method for producing fuels with relatively low sulfur concentrations and commercial hydrodesulfurization plants for treating fuel oils are now in operation to provide fuel oils that have legally acceptable sulfur levels. At this time, maximum sulfur contents of motor fuels have not been established by the government; however, the situation is changing rapidly. Restrictions on sulfur contents of motor fuels seem inevitable. The sulfur concentrations of blending components for the refinery gasoline pool and, hence, of cracked naphtha will have to be reduced.

Therefore, if the cracked naphtha is to be desulfurized without eliminating or seriously reducing the amount of olefins that are present therein, the desulfurization process that is used must be very selective, i.e., capable of removing substantially all of the sulfur without severely saturating the olefins that are present. Currently, there are several desulfurization catalysts that find considerable use in the petroleum refining industry. Such desulfurization catalysts include cobalt and molybdenum and their compounds on a suitable support, nickel and tungsten and compounds thereof on a suitable support, and nickel and molybdenum and compounds thereof on a suitable support. The support, in general, is the non-acidic or weakly-acidic catalytically active alumina. Such conventional desulfurization catalysts are selective, that is, these catalysts not only remove sulfur from the petroleum hydrocarbon stream being treated, but also tend to restrict the saturation of olefins in that petroleum hydrocarbon stream.

Cole, in U.S. Pat. No. 2,392,579, discloses a process for treating olefinic and sulfur-bearing gasolines to effect substantial desulfurization and refining. A portion of partially treated product is recycled to maintain a small concentration of olefins in the hydrogenation reaction zone to prevent to a certain extent the undesired hydrogenation of normal olefins and aromatics. Cole teaches that the catalyst employed may be any of the known conventional super-active hydrogenation catalysts and composites thereof which may or may not contain such materials as alumina, magnesia, silica, zinc oxide, chromium oxide, etc., as stabilizers, promoters, or supports. Cole requires olefin recycle and does not provide any specific examples of the catalyst of the present invention.

Haensel, in U.S. Pat. No. 2,770,578, discloses a process for treating unsaturated and sulfur-containing stocks to obtain saturated and substantially sulfur-free charge stocks for other processes, which process employs two distinct catalysts, a hydrogenation catalyst comprising platinum and/or palladium, preferably combined with a carrier of silica, alumina, zirconia, titania, activated carbon, magnesia, or combinations thereof, and a sulfur-resistant desulfurization catalyst, such as a Group VI metal and an iron group metal on a suitable support, such as those employed in the hydrogenation catalyst. Haensel teaches that the process first uses the hydrogenation catalyst to saturate the unsaturated compounds in the feedstock at a temperature which is too low to effect desulfurization and then desulfurizes the saturated, unpolymerizable stock that is produced. Haensel wants saturation of unsaturates and removal of sulfur and does not give examples of the catalyst of the present invention.

Lefrancois, in U.S. Pat. No. 3,269,938, teaches a hydrogenation process employing a catalyst comprising molybdenum and nickel on a particular support of silica-magnesia to produce a product having a lower degree of unsaturation. The Lefrancois patent teaches that the process is particularly suited for the hydrogenation of low-quality kerosene. The Lefrancois patent does not disclose a process for the desulfurization of a cracked naphtha without substantial saturation of the olefins contained in the cracked naphtha. The patent does say that the process may be used to selectively hydrogenate any diolefins present in a catalytically cracked gasoline to monoolefins.

Gislon, et al., in U.S. Pat. No. 2,853,429, disclose a desulfurization catalyst that contains a Group VI metal, a Group VIII metal, and magnesia. It does not teach, disclose, or suggest the selective desulfurization of cracked naphthas or, for that matter, the selective desulfurization of any feedstock. In Examples 4 and 6, a straight-run gas oil is employed. In Examples 5 and 7, a catalytic cycle stock, having a boiling range of 215° C. (419° F.), to 320° C. (608° F.) and a sulfur content of 1.9% sulfur, is used. Neither of these feeds are cracked naphthas, as described hereinafter. Moreover, there is no indication of the presence of olefins in either the feedstocks or the products of these examples.

Eng, et al., in U.S. Pat. No. 3,475,327, disclose a process for the hydrodesulfurization of blended feedstocks. The blended feedstocks may contain virgin or straight run naphthas, coker naphthas, steam cracked naphthas or pyrolysis gasoline, catalytic gas oils, coker gas oils, and straight run gas oils. The process of Eng, et al., comprises contacting the feedstock with a catalyst comprising a mixture of a member of the group consisting of Group VI oxides and sulfides with a member of the group consisting of iron, cobalt, and nickel oxides and sulfides deposited upon a porous carrier, such as alumina, silica-alumina, bauxite, kieselguhr, magnesia, or zirconia. Eng, et al., indicate that a preferred catalyst is cobalt molybdate on a silica-stabilized alumina. This patent limits the amount of cracked naphtha that may be present in the feed being treated by the disclosed process. It does not disclose the treatment of a feed that is one hundred percent cracked naphtha. While this patent mentions a large number of porous carriers that may be used in the catalyst, it does not provide any specific examples of the catalyst of the present invention.

Conway, in U.S. Pat. No. 3,956,105, discloses processes for the hydrotreating of various hydrocarbons and mixtures of hydrocarbons, the catalyst that is employed in such hydrotreating processes, and the method for preparing such catalyst. Conway teaches that the catalyst constitutes a Group VIB component and a Group VIII component and a porous carrier material, and may contain a halogen and/or an alkali or an alkaline earth metal. Various porous carriers are considered as the carrier for the catalyst. Conway suggests that the carrier material is a refractory inorganic oxide, either alumina in and of itself or in combination with one or more refractory inorganic oxides, and particularly in combination with silica. While magnesia is mentioned as one of the porous carrier materials available or suitable, Conway does not specifically provide in any example an exact catalytic composition of the catalyst employed in the present application.

Meyer, in U.S. Pat. No. 3,764,519, discloses processes for the hydrocracking and hydrodenitrification of hydrocarbon fractions. They employ a catalyst that comprises an alumina-silica-magnesia matrix containing a hydrogenation component and a crystalline zeolitic molecular sieve substantially free of hydrogenation components and dispersed in the alumina-silica-magnesia matrix.

Bertolacini et al. in copending U.S. patent application Ser. No. 820,376, filed July 29, 1977, which is incorporated herein by reference, disclose a process for hydrodesulfurization of cracked naphtha with a catalyst comprising Group VIB and Group VIII metals deposited on a solid support comprising magnesium oxide as the sole support or comprising at least 70% by weight magnesium oxide. Bertolacini et al's. preferred catalysts contain a Group VIB metal in an amount of about 10 wt. % to about 20 wt. % and Group VIII metal in an amount of about 1 wt. % to about 10 wt. % calculated as the oxide of the respective metals. While the desulfurization catalysts comprising magnesium oxide support as taught by Bertolacini et al. have enabled the hydrodesulfurization process to achieve improved selectivity in comparison to desulfurization catalyst having a conventional support, such as alumina, we have found that selectivity in the desulfurization of cracked naphtha can surprisingly be further improved by reducing the level of Group VIB and Group VIII metals conventionally used in desulfurization catalysts. While conventional desulfurization catalysts contain levels of Group VIB metal in the general range of about 10 wt. % to about 20 wt. % and Group VIII metal in an amount of about 1 wt. % to about 10 wt. % usually supported on a catalytically active alumina, we have found that unexpectedly better selectivity can be achieved in desulfurization of the cracked naphtha when the catalyst employed comprises reduced levels of Group VIB metal in an amount of about 4 wt. % to about 6 wt. % with a Group VIB metal in an amount of about 0.5 wt. % to about 2 wt. % when said metals are deposited on a support comprising magnesium oxide; the amount of said Group VIB metal and the amount of said Group VIII metal are calculated as the oxide of the respective metal and based on the total weight of the catalyst. Preferably, the Group VIB metal is molybdenum and the Group VIII metal is cobalt, said molybdenum and said cobalt being present as a member selected from the group consisting of (1) the elements, (2) their oxides, (3) their sulfides and (4) mixtures thereof.

The general object of this invention is to improve the selectivity in the desulfurization of cracked naphtha in order to minimize octane loss in the product by reducing olefin saturation in the hydroprocessing. Other objects appear hereinafter.

We have found that the objects of this invention can be attained by desulfurizing cracked naphtha in the presence of catalyst comprising a reduced level of Group VIB and Group VIII metals, when deposed on a support comprising at least about 70 wt. % magnesium oxide.

Briefly, this invention comprises contacting a cracked naphtha in a reaction zone under hydrodesulfurization conditions and in the presence of hydrogen with a catalyst comprising a hydrogenation component comprising a Group VIB metal of the Periodic Table of Elements and a Group VIII metal of the Periodic Table of Elements deposed on a solid support comprising magnesium oxide; the Group VIB metal of the catalytic composition that is employed in the process of the present invention is present in an amount of about 4 wt. % to about 6 wt. % and the Group VIII metal of the catalytic composition is present in an amount of about 0.5 wt. % to about 2 wt. % each amount being based on the total weight of the catalyst and being calculated as the oxide of the respective metal. The Periodic Table of Elements to which this description refers is the Periodic Table that appears on page 628 of WEBSTER'S SEVENTH NEW COLLEGIATE DICTIONARY, G. and C. Merriam Company, Springfield, Massachusetts, U.S.A., 1965.

The preferred Group VIB metal is molybdenum while the preferred Group VIII metal is cobalt. These metals are present in the catalyst as a member selected from the group consisting of (1) the elements, (2) their oxides, (3) their sulfides, and (4) mixtures thereof.

Experience in the use of conventional desulfurization catalysts has not suggested that reducing the level of the active metals will do more than reduce the resulting activity of such catalysts and the surprising result of selectivity improvement is of significant commercial importance. While use of desulfurization catalyst having lower metals loading than conventionally employed can, at given flow rate and reactor conditions, result in higher catalyst requirement to reduce the sulfur to the same level, the higher octane of the obtained product can economically justify lower space velocity.

In addition to minimizing the loss in product octane, the more selective catalyst consumes less hydrogen in producing the same level of desulfurization. Therefore, the catalyst of this invention can emphasize desulfurization selectivity and economics where hydrogen is expensive or in short supply, even for hydrodesulfurization of feedstocks in addition to catalytic naphtha.

The solid support of the catalytic composition that is employed in the process of the present invention is a support that comprises magnesium oxide. While the support may be solely magnesium oxide, it may also comprise a refractory inorganic oxide, such as a member selected from the group consisting of catalytically active alumina, silica-alumina, and silica. The catalytically active alumina may be gamma-alumina, eta-alumina, or mixtures thereof. Such alumina will generally have an average pore size that is greater than 70 Angstrom units and may extend up to 200 Angstrom units, or more. In addition, suitable catalytically active aluminas will have surface areas that are at least 150 square meters per gram and may extend up to surface areas that are 800 square meters per gram or larger. Silica-alumina that may be employed as the refractory inorganic oxide may be either a low-alumina silica-alumina, which has an alumina content of about 5 wt. % to about 15 wt. % or high-alumina silica-alumina, which has an alumina content in the range of about 15 wt. % to about 40 wt. %

When the support comprises an alumina in addition to the magnesium oxide, the catalyst support should contain at least 70 wt. % magnesium oxide, based on the weight of the support. The support can be 100 wt. % magnesium oxide and preferably the support contains at least 86 wt. % magnesium oxide.

BRIEF DESCRIPTION OF THE DRAWING

The FIGURE represents a simplified process flow diagram of an embodiment of the process of the present invention.

The catalytic composition that is employed in the process of the present invention may be prepared by impregnating magnesium oxide with the heat-decomposable compounds of the hydrogenation metals. In general, either a solution containing both metals or a solution containing one of the metals to be impregnated on the support, followed by a solution containing the other metal, may be employed. In the event that the support material is a combination or mixture of the magnesium oxide and a refractory inorganic oxide, the support material may be prepared by suitable conventional methods for making catalytic supports containing one or more components and the resultant support may then be impregnated with the desired solution or solutions. In either case, the impregnated support material is then dried in air at a temperature of about 250° F.–350° F. for a period of 1 to 20 hours and the dried material is subsequently calcined at a temperature of about 700° F. to about 1,100° F., preferably, about 800° F. to about 1,000° F., for a period of from about 1.5 to about 10 hours. A convenient rate of air that may be employed during such drying and calcination is an air rate of about 1.5 cubic feet per hour, although other air rates may be conveniently used. Alternatively, a blend of magnesium oxide powder, aqueous solutions of compounds of the hydrogenation metals, and sol alumina can be prepared and the resultant blend can be dried, ground to a finely divided material, pelleted to an appropriate size, and calcined. Conditions employed for the drying may be as listed above, while the calcination may be carried out as above or by calcining the pellets for at least 1 to 2 hours at a temperature as low as 450° F., gradually increasing the temperature to a temperature that approaches 1,000° F. to 1,100° F. and maintaining such higher temperature for several hours.

Figure 1:
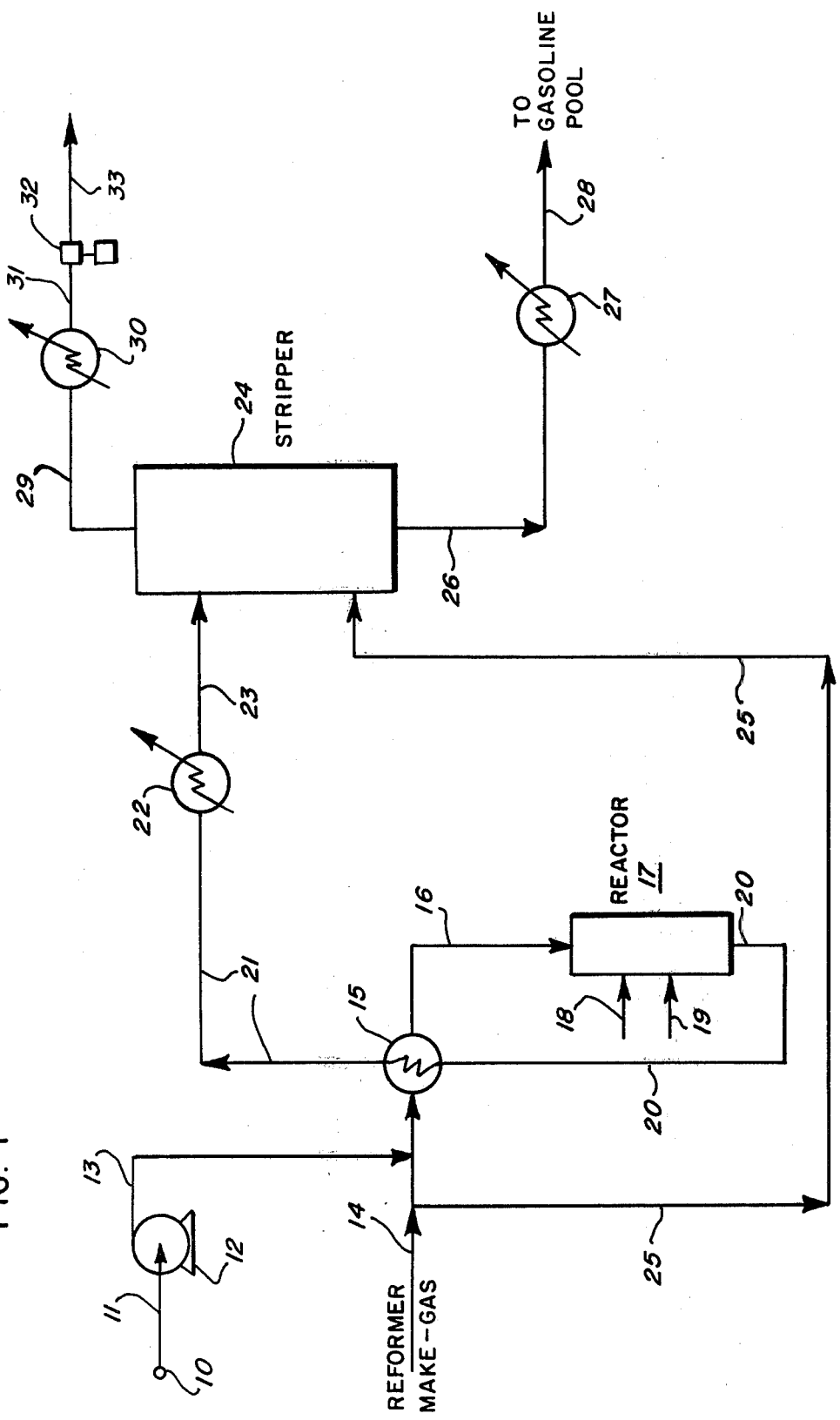

The hydrodesulfurization conditions that are employed during the process of the present invention comprise the following conditions: a temperature of about 450° F. to about 750° F., a total pressure of about 75 psig to about 600 psig, a hydrogen-to-hydrocarbon ratio of about 200 SCFB to about 5,000 SCFB, and a WHSV of about 0.5 to about 15 weight units of hydrocarbon per hour per weight unit of catalyst. Preferred hydrodesulfurization conditions comprise a temperature of about 525° F. to about 700° F., a total pressure of about 150 psig to about 400 psig, a hydrogen-to-hydrocarbon ratio of about 300 SCFB to about 2,000 SCFB, and a WHSV of about 2 to 10 weight units of hydrocarbon per hour per weight unit of catalyst.

It is beneficial for the proper maintenance of selectivity that the process conditions be regulated so that total vaporization of the reactants and products is present in the reaction zone. Moreover, the hydrogen partial pressure should be at least 60 psia; preferably, the hydrogen partial pressure should be at least 80 psia.

Typical feedstocks that may be employed in the process of the present invention include catalytically-cracked naphthas and coker naphthas. Such feedstocks not only contain paraffins, naphthenes, and aromatics, but also unsaturates, such as open-chain and cyclic olefins, diolefins, and cyclic hydrocarbons with olefinic side chains. Such feedstocks generally have a boiling range of about 120° F. to about 400° F., and may have a maximum boiling temperature of about 445° F. Cracked naphthas generally contain from about 0.1 wt. % sulfur to about 0.4 wt. % sulfur and up to about 20 to 1000 ppm of nitrogen. Coker naphthas may contain up to about 1 wt. % sulfur and up to about 500 ppm nitrogen.

A simplified schematic flow diagram of an embodiment of the process of the present invention is presented in accompanying FIGURE. This embodiment and the following experimental examples are presented for purposes of illustration only and are not intended to limit the scope of the present invention.

The process flow scheme represented in accompanying FIGURE is a simplified process scheme and does not show various pieces of auxiliary equipment, such as valves, certain heat exchangers, pumps and compressors. Those skilled in the art would recognize the need and location of such auxiliary equipment and, hence, such equipment is not presented.

Referring now to accompanying FIGURE, catalytically cracked naphtha, usually stabilized heavy naphtha (SHN), is obtained from source 10 and is passed through line 11 into pump 12 to be pumped through line 13. Reformer make-gas is passed through line 14. The SHN in line 13 is introduced into line 14 to be mixed with the reformer make-gas. The mixed reformer-make-gas SHN stream is then passed through heat exchanger 15 to be heated to the temperature being employed in the reactor, such heating being accomplished by heat exchange with reactor effluent. The heat mixed reformer-make-gas SHN stream is then passed through line 16 into the top of reactor 17.

Reactor 17 contains one or more beds of a catalytic composition comprising about 0.5 to about 2 wt. % cobalt oxide and about 4 to about 6 wt. % molybdenum trioxide on a support of magnesium oxide. Please note that an external heat source (not shown) would be required to start and in some cases maintain the reaction. In addition, since some olefin hydrogenation will occur, there will probably be about a 75° F. to 100° F. temperature rise across the reactor. Such phenomenon will require special instrumentation or a hydrogen quench to avoid run-away reaction temperatures. If needed, hydrogen quench may be obtained from lines 18 and 19.

The effluent from reactor 17 is passed through line 20 to heat exchanger 15, where it is cooled, and then through line 21 into condenser 22. The cooled effluent is then passed through line 23 into stripper 24. Stripping may be accomplished by using reformer make-gas from line 25. While this arrangement is preferred, a reboiled stripper could be used. Stripper 24 is employed to remove hydrogen sulfide from the product. The liquid product is withdrawn from stripper 24 by way of line 26 to be cooled in condenser 27 and then sent through line 28 to the gasoline pool. The overhead from stripper 24 is removed by way of line 29. This overhead contains from about 0.2 to about 2 mole % hydrogen sulfide. The overhead is cooled in condenser 30 and then sent by way of line 31 to be recompressed in compressor 32. The recompressed gas is sent by way of line 33 for reuse or for discharge to fuel.

The following examples are illustrative of this invention but do not indicate limitation upon the scope of the claims.

CATALYST PREPARATION

An embodiment of the catalyst employed in the process of the present invention, designated Catalyst I, was prepared as follows: a 1125-gram portion of heavy magnesium oxide powder obtained from the Mallinckrodt Chemical Company, was impregnated with a solution that had been prepared by dissolving 67.5 grams of ammonium molybdate in 1200 ml of hot distilled water (about 160° F) and adding 45 grams of cobaltous nitrate. The impregnated material was dried in air at 300° F for 6 hours, ground to pass through a 25-mesh screen (U.S. Sieve Series), pelleted into ⅛-inch pellets (employing 5% Sterotex, a vegetable based lubricant manufactured by Capital City Products Division of Stokley-Van Camp, Incorporated, calcined in air for 2 hours at a temperature of 450° F., and subsequently calcined in air for 2 hours at a temperature of 800° F. During the drying and calcination sequences, an air flow rate of about 1.5 cubic feet per hour was employed. Catalyst I was prepared to contain about 1 wt. % cobalt oxide and about 5 wt. % molybdenum trioxide, based on the weight of the catalytic composition. The catalytic support was made up of 100 wt. % magnesium oxide. Actual analysis indicated the composition to be 0.94 wt. % cobalt oxide, and 4.73 wt. % molybdenum oxide.

The catalyst can be improved in higher crushing strength and lower abrasion loss if molybdenum sulfide is used to replace Sterotex as the lubricant for pelleting. For example, after the paste of the metal salts and magnesia is dried and ground, the fine catalyst powder can be blended with about 1% molybdenum sulfide and then pelleted, with subsequent calcination, as previously described.

For comparison, a second catalyst, Catalyst II, having higher metal loading, was evaluated using the composition taught in copending application Ser. No. 820,376 referred to hereinabove, and prepared according to the procedure used to prepare Catalyst I with the major exceptions that the calcination was completed at a temperature of about 1,000° F and the catalyst contained 3.0 weight % cobalt oxide, 16.6 weight % molybdenum oxide, and 80 weight % magnesium oxide.

Comparison of the composition of Catalyst I and Catalyst II is summarized in Table 1.

TABLE 1

CATALYST COMPOSITIONS
⅛" Pellets

| Chemical Composition. Wt % | Catalyst I | Catalyst II |
|---|---|---|
| CoO | 0.94 | 3.0 |
| MoO$_3$ | 4.73 | 16.6 |
| MgO | 94 | 80 |

CATALYST PERFORMANCE

Both Catalysts I and II were tested for ability to desulfurize a cracked naphtha feedstock with properties presented in Table 2. Performance was evaluated using bench-scale reactor vessels of 1" and ¾" ID, with electrical heating zones to maintain an isothermal temperature profile. The reactors were operated in an integral manner with once-through hydrogen and oil flows.

During each day, at least a 2-hour sample of the product was collected and was subsequently washed with acidified cadmium sulfate solution to remove hydrogen sulfide. This washing procedure was adapted from ASTM D-1323 procedure for mercaptan analysis. The product was then analyzed for sulfur by X-ray fluorescence technique and for bromine number by ASTM D-1159 procedure. The change in bromine number was used as the measure of olefin saturation. In addition, product octane numbers were measured periodically.

Each catalyst was presulfided with a mixture of 8 vol. % hydrogen sulfide in hydrogen. This presulfiding treatment took place for 2–3 hours at atmospheric pressure, a temperature of 565° F., and a gas flow rate of about 1–3 cubic feet per hour, unless conditions specified otherwise.

A further test of Catalyst I was made in an adiabatic pilot plant unit with a reactor vessel 13 feet long and 1.05" ID. This reactor had 12 adiabatic heating zones and a separate preheater section. In this test, the adiabatic reactor was loaded with 1356 grams. The catalyst was presulfided with a mixture of 8 volume % hydrogen sulfide in hydrogen at 4.5 cubic feet per hour for 20 hours. The dry pre-sulfiding exothermic reaction caused portions of the catalyst bed to reach temperatures in the range of 560°–875° F. After presulfiding, the reactor temperature was lined out to 500° F. The cracked naphtha feed stock specified in Table 2 was used to test the catalyst with once-through feed and hydrogen; the results were presented in Table 3 as Test 5.

TABLE 2

FEED PROPERTIES

| | |
|---|---|
| Gravity, ° API | 49.3 |
| Sulfur, Wt% | 0.19 |
| Nitrogen, ppm | 76 |
| Bromine No., cg Br/gm | 74.5 |
| FIA, vol% | |
|   Saturates | 21.5 |
|   Olefins | 43.0 |
|   Aromatics | 35.5 |
| Distillation, 760 mm Hg ASTM, ° F | |
|   IBP | 143 |
|   10% | 200 |
|   20% | 223 |
|   30% | 241 |
|   40% | 257 |
|   50% | 270 |
|   60% | 283 |
|   70% | 295 |
|   80% | 310 |
|   90% | 328 |
|   FBP | 387 |
| Motor Octane | |
|   Clear | 80.1 |
|   +3 cc TEL | 84.2 |
| Research Octane | |
|   Clear | 93.5 |
|   3 cc TEL | 97.2 |
| Maleic Anhydride Value, mg/gm | 13.4 |
| Sulfur Compound Distribution: Wt% | |
| Total Sulfur as | |
|   Thiophenic | 84 |
|   Non-Thiophenic | 16 |
| Thiophenic as | |
|   1-ring | 96.9 |

TABLE 2-continued

| FEED PROPERTIES | |
|---|---|
| 2-ring | 3.1 |

Performance data for comparison of the high and low metals catalysts are presented in Table 3. Within each numbered test, data for successive samples is presented at various times for hours on oil. The values for sulfur reduction are presented as weight percent desulfurization and weight percent olefin saturation is also presented. The selectivity presented is defined as the ratio of first order reaction rate constants for desulfurization over saturation; for an integral or plug-flow reactor, selectivity is expressed by the relation $$\text{selectivity} = \log f_s / \log f_o$$

where $f_s$ and $f_o$ are the fractions remaining of sulfur and olefins after desulfurization.

Selectivity is the overriding concern in the hydrodesulfurization of the cracked naphtha since the olefin saturation most strongly determines what octane loss will occur at a given level of desulfurization. Therefore, process economics are quite sensitive to selectivity.

The surprising selectivity improvement achieved by the catalyst of this invention, embodied in low-metals Catalyst I, is best shown by comparing performance at approximately the same level of desulfurization in the tests of both catalysts. For example, in Test No. 1, at 216 hours on oil for Catalyst II, with a desulfurization level of 84.3 wt. % the selectivity of the catalyst is 4.9; for Catalyst I in Test 4 at 257 hours on oil the desulfurization level is nearly the same at 82.0 wt. % but the selectivity of 12.3 is surprisingly superior to Catalyst II. Further comparison is shown with Test No. 1, at 480 hours on oil for Catalyst II, with a desulfurization level of 93.9 wt. % the selectivity of the catalyst is 5.6; for Catalyst I in Test No. 5 at 408 hours on oil, the desulfurization level is nearly the same at 91.5 wt. % but the selectivity of 9.1 is again surprisingly superior to Catalyst II. Overall, the selectivity produced using Catalyst I is significantly greater than the selectivity produced by Catalyst II throughout every test.

Table 3 indicates that the desulfurization activity of Catalyst I is somewhat lower than the desulfurization activity of Catalyst II and generally Catalyst I requires a lower space velocity to achieve a given level of desulfurization. However, the desulfurization activity of Catalyst I is improved by sulfiding pretreatment at the higher temperatures employed with the catalysts in Tests 3 and 5 compared to the lower temperature (565° F.) presulfiding of the catalyst in Test 4.

Where they were measured, Table 3 includes values for the difference in octane number between the desulfurized product and the feedstock. The difference in

TABLE 3

PERFORMANCE COMPARISON HIGH- AND LOW-METALS CATALYSTS

| Test No. | Catalyst (Loading) | Hours on Oil | Pressure, psig | Temperature, °F | WHSV | H₂/Oil, SCFB | Desulfurization, Wt % | Olefin Saturation, Wt. % | Selectivity | Δ Octane Unleaded Motor |
|---|---|---|---|---|---|---|---|---|---|---|
| 1 | II (100 gms) | 144 | 150 | 565 | 3.0 | 1000 | 78.7 | 27.8 | 4.7 | ND*** |
|   |   | 216 | 150 | 576 | 3.0 | 1000 | 84.3 | 31.6 | 4.9 | −1.6 |
|   |   | 480 | 150 | 575 | 2.0 | 1000 | 93.9 | 40.1 | 5.6 | −2.6 |
| 2 | II (75 gms) | 168 | 150 | 575 | 3.0 | 986 | 85.0 | 30.0 | 5.3 | ND |
|   |   | 552 | 150 | 577 | 3.0 | 1040 | 83.6 | 32.0 | 4.7 | ND |
| 3 | I* (50 gms) | 121 | 150 | 560 | 2.0 | 1095 | 74.5 | 16.3 | 7.6 | ND |
|   |   | 166 | 150 | 561 | 2.0 | 942 | 77.0 | 15.9 | 8.0 | ND |
| 4 | I (50 gms) | 114 | 150 | 560 | 2.0 | 1040 | 55.0 | 8.5 | 8.8 | ND |
|   |   | 140 | 150 | 560 | 2.0 | 1040 | 57.0 | 7.6 | 10.7 | ND |
|   |   | 192 | 150 | 596 | 2.0 | 1072 | 74.0 | 14.2 | 8.6 | ND |
|   |   | 257 | 150 | 600 | 2.1 | 1010 | 82.0 | 13.0 | 12.3 | ND |
| 5 | I** (1356 gms) | 192 | 150 | 561 | 3.0 | 1009 | 80.0 | 18.5 | 7.3 | −0.36 |
|   |   | 336 | 150 | 534 | 2.0 | 1012 | 73.5 | 14.0 | 8.4 | −0.34 |
|   |   | 408 | 150 | 565 | 2.0 | 1096 | 91.5 | 24.0 | 9.1 | −0.9 |

*Sulfided at 700° F., 20 hours, 8% H₂S in H₂.
**Sulfided at 560-875° F., 20 hours, 8% H₂S in H₂.
***Not determined.

octane number is generally a minus value, indicating a loss in octane value from the feed to the desulfurized product.

We claim:

1. A process for the selective desulfurization of cracked naphthas, which process comprises contacting a cracked naphtha comprising paraffins, naphthenes, aromatics, and unsaturates in a reaction zone under hydrodesulfurization conditions and in the presence of hydrogen with a catalyst to furnish a product containing unsaturates and a reduced amount of sulfur, said catalyst comprising a hydrogenation component which comprises a Group VIB metal and a Group VIII metal deposed on a solid support comprising at least 70 wt. % magnesium oxide, said Group VIB metal and said Group VIII metal being present as a member selected from the group consisting of (1) ) the elements, (2) their oxides, (3) their sulfides, and (4) mixtures thereof wherein said Group VIB metal of said catalyst is present in an amount of about 4 wt. % to about 6 wt. % and said Group VIII metal of said catalyst is present in an amount of about 0.5 wt. % to about 2 wt. % each amount being based on the total weight of the catalyst and being calculated as the oxide of the respective metal.

2. The process of claim 1 wherein said support further comprises catalytically active alumina.

3. The process of claim 1 wherein said catalyst comprises a support of magnesium oxide.

4. The process of claim 1 wherein said Group VIB metal of said catalyst is molybdenum and said Group VIII metal is cobalt.

5. The process of claim 1 wherein said hydrodesulfurization conditions comprise a temperature of about 450° F. to about 750° F., a total pressure of about 75 psig to about 600 psig, a hydrogen-to-hydrocarbon ratio of about 200 SCFB to about 5,000 SCFB, and a WHSV of about 0.5 to about 15 weight units of hydrocarbon per hour per weight unit of catalyst.

6. The process of claim 5 wherein said support further comprises catalytically active alumina.

7. The process of claim 5 wherein said hydrodesulfurization conditions are regulated so that total vaporization of reactants and products is present in said reaction zone.

8. The process of claim 5 wherein the hydrogen partial pressure is at least 60 psia.

* * * * *